United States Patent [19]

Massar et al.

[11] Patent Number: 5,450,070
[45] Date of Patent: Sep. 12, 1995

[54] ELECTRONIC MISSING FILE LOCATOR SYSTEM

[76] Inventors: Sheppard Massar, 172 Dorchester Dr.; Ted N. Altman, 436 Dutch Neck Rd., both of East Windsor, N.J. 08520

[21] Appl. No.: 222,330

[22] Filed: Apr. 4, 1994

Related U.S. Application Data

[63] Continuation of Ser. No. 852,699, Mar. 17, 1992, abandoned.

[51] Int. Cl.6 .................................................. H04Q 1/00
[52] U.S. Cl. .......................... 340/825.35; 340/825.54; 340/825.49; 340/572
[58] Field of Search ............... 340/825.49, 825.54, 340/825.35, 568, 571, 572

[56] References Cited

U.S. PATENT DOCUMENTS

| | | | |
|---|---|---|---|
| 3,701,987 | 10/1992 | Leighton | 340/572 |
| 4,101,873 | 7/1978 | Anderson et al. | 340/539 |
| 4,476,469 | 10/1984 | Lander | 340/825.49 |
| 4,507,653 | 3/1985 | Bayer | 340/539 |
| 4,598,272 | 7/1986 | Cox | 340/825.49 |
| 4,636,950 | 1/1987 | Caswell | 340/825.54 |
| 4,818,855 | 4/1989 | Mongeon | 340/825.54 |
| 4,862,160 | 8/1989 | Ekchian | 340/825.54 |
| 5,063,380 | 11/1991 | Wakura | 340/825.54 |

OTHER PUBLICATIONS

"Dallas Semiconductor DS6068AK Wireless Starter Kit User's Manual, Version 2.00".

*Primary Examiner*—Donald J. Yusko
*Assistant Examiner*—Brian Zimmerman
*Attorney, Agent, or Firm*—Watov & Kipnes

[57] ABSTRACT

A file folder locating system which includes a transmitter to selectively transmit packets of radio frequency cycles indicative of the coded address of a particular folder. A transponder, attached to the folder, receives the transmission and responds thereto by producing an audible sound which enables the file to be easily located.

11 Claims, 3 Drawing Sheets

ELECTRONIC MISSING FILE LOCATOR SYSTEM

This is a continuation of U.S. Pat. No. 07/852,699, filed Mar. 17, 1992, now abandoned.

BACKGROUND OF THE INVENTION

In offices having large numbers of files, there are numerous times when inordinate amounts of time are required to locate files that are either misfiled or located in any one of a number of places where they may be used. It is imperative, in some circumstances, that a file be located quickly.

In known object locating systems, a searcher is used that emits either radio frequency, light or sonic waves to which a transponder in the object being sought audibly responds so as to indicate its location. In one of the systems described in U.S. Pat. No. 4,476,469, for example, pulse position modulated radio frequency waves are transmitted by a hand held searcher, and a transponder in the object being searched produces a series of audible tones in response to a particular pulse position modulation. The transponder includes all of the stages of a radio receiver for deriving the transmitted coded information so that it is expensive. Furthermore, it is stated that satisfactory operation up to 20 feet was not attained owing to the fact that the transmitted signal strength falls off rapidly with distance. This suggested that sonic or ultrasonic rather than RF waves should be transmitted by the searcher, but they would be severely attenuated by paper files so as not to be useful in searching for a file that may be in a stack.

Bayer, U.S. Pat. No. 4,507,653, discloses an integrated circuit receiver including audio detecting means, and an audio transducer for producing an audible sound. Bayer's device is designed to be attached to address books, daily schedule books, passports, credit cards holders, billfolds, eyeglasses, keys, and other such objects as discussed in column 3, lines 59 through 65. Each receiving unit includes an audio detector that is responsive to human-generated sounds such as a particular sequence of clapping noises, for producing a binary or electronically generated pulse whenever the appropriate sequence of sound waves are received, whereby the binary pulse is applied to a detection circuit for producing a plurality of second signals which are applied to a transducer for generating audible tones, thereby permitting a lost object to be uncovered.

Anderson, et al., U.S. Pat. No. 4,101,873 discloses a system for locating misplaced objects that includes miniaturized receivers that are activated by radio signals from a transmitter, for emitting audible tones to locate the missing object. The range of the system is about 300 ft. The receivers are designed to be activated by a signal of a particular frequency, for in turn activating an acoustic generator to emit a sound wave of a frequency in the more sensitive frequency region of human hearing. The transmitter is a tone generator, whereby the transmission signals will be of various tones for activating receivers that are designed to receive a particular combination of tones.

In most filing systems there are a large number of files that are continually changing so that it would be highly advantageous to be able to easily assign addresses to the new files. Unfortunately, in the location systems of the aforesaid patents there is no way of changing the address of an object by operation of the searcher.

Furthermore, the components serving as transponders in prior systems are far too thick to be used in a file.

BRIEF SUMMARY OF THE INVENTION

In accordance with this invention, a hand held searcher or transmitter emits packets of given respective numbers of cycles of radio frequency waves that are coded so as to represent addresses or command functions to which the transponder in a file responds. By way of example, the transmission of a packet of 100 cycles could activate the transponder, and the 0's and 1's of a digital address are represented by packets of 20 and 40 cycles, respectively.

In order to locate a particular file, for example, all files are first activated by transmission of a packet of 100 cycles, and coded packets are sent indicating to the transponder that they should energize their sound producing device if they should receive their address. Thus, when the address of the desired file is transmitted, a sound emanates from the transponder of the associated file so that it can be found.

Should it be necessary to assign an address to a file, its current address is read by transmitting a packet of 100 cycles of RF so as to activate it and send coded packets that cause it to output the stored address. Additional packets are then transmitted that cause the transponder to record a following address.

The means by which these operations are carried out includes an RF Communicator DS6068A system that serves as a transmitter and a DS1209S-B1 chip that serves as a transponder, both of which are products of Dallas Semiconductor Co., Inc. of 4401 South Beltwood Parkway, Dallas, Tex. 75244-3292. The address of the desired file as well as the command functions are provided by a personal computer or terminal via an RS-232 port, for programming the transmitter and a transponder to the address.

The DS1209S-B1 transponder chip was designed to implement an addressable, full duplex wireless to 3-wire communication channel and has more pins and functions than are required by this invention. Its wireless transmit terminal TX is used to energize a crystal or some other device so as to produce an audible sound when required.

It is vitally important for the transponder, the battery therefor and the sound producing means to be thin so that they can be mounted in or upon a folder without significantly increasing its thickness. The DS1209S-B1 transponder chip is only 100 mils thick and sound may be produced by devices less than 0.1 inch thick, such as used in alarms in watches.

DETAILED DESCRIPTION OF THE INVENTION

Figure 1:
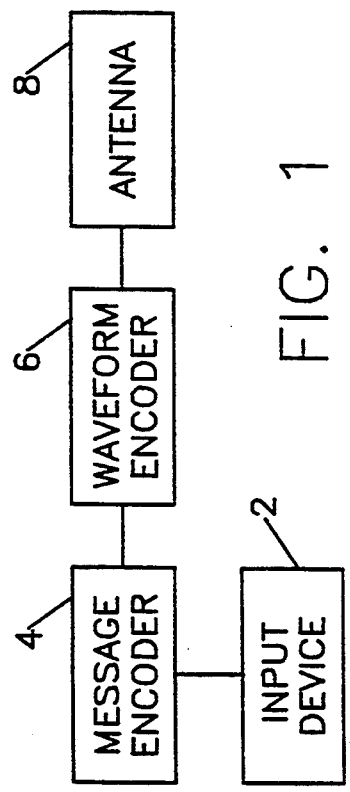
FIG. 1 is a block diagram of a transmitter for use in a searcher of this invention.

The functions to be formed by a transmitter are shown by the blocks in FIG. 1. An input device 2 is used by the operator to select a file, to select the operation to be performed, and to initiate transmission. The operations include obtaining the address of a file, changing the address of a file and causing an addressed file's transponder to emit sound so that the file can be found.

A message encoder 4 contains all of the logic necessary to accept requests from the input device 2, to construct the patterns of transmitted characters comprising addresses and function codes necessary to implement the selected function on the selected transponder, and to pass this information to a waveform encoder 6. The waveform encoder 6 creates the actual voltage waveforms that are applied to a transmission loop antenna 8. In order to insure that a transmission is received by a selected transponder, the output waveform may be transmitted a number of times. This may also be done in order to lengthen the time during which a transponder produces an audible tone.

Figure 2:
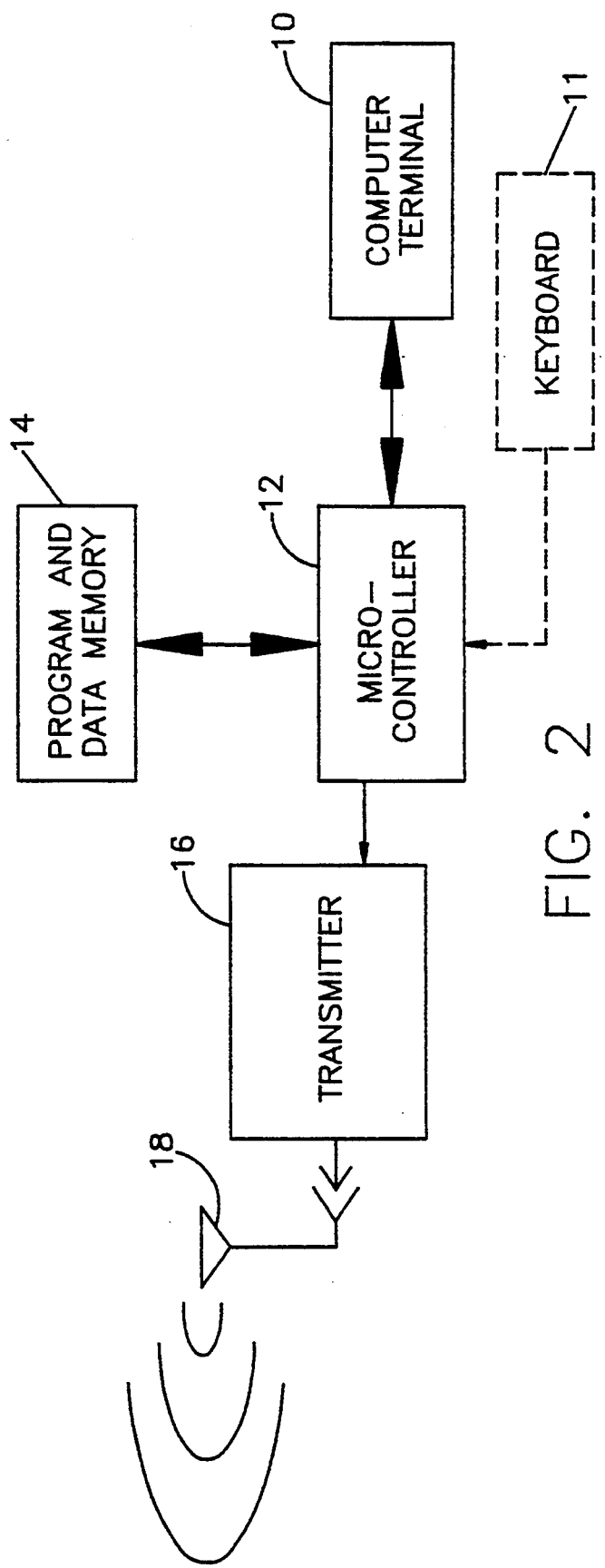
FIG. 2 is a block diagram of a DS6068AK device that may be used to perform the functions of the block diagram, of FIG. 1.

FIG. 2 is a block diagram of a DS6068A radio frequency communicator that performs the functions indicated in the blocks 4,6 and 8 of FIG. 1. An operator selects the desired file and the operation to be performed with an IBM ® compatible computer terminal 10 that is coupled to the communicator via an RS232 port in a DS2250 micro-controller 12. The encoding functions of the block 4 are contained in a program and data memory 14. When transmissions are to be made, the micro-controller 12 energizes a transmitter 16 that operates at a given frequency such as 133.3 KHz, for example, and radiates the signals on an antenna 18. Alternatively, as shown in FIG. 2 in phantom, a keyboard 11 can be provided in combination with microcontroller 12 to take the place of computer terminal 10. In this alternative embodiment, microcontroller 12 is programmed to provide the functions otherwise provided by computer terminal 10, and may include the program and data memory function 14.

Figure 3:
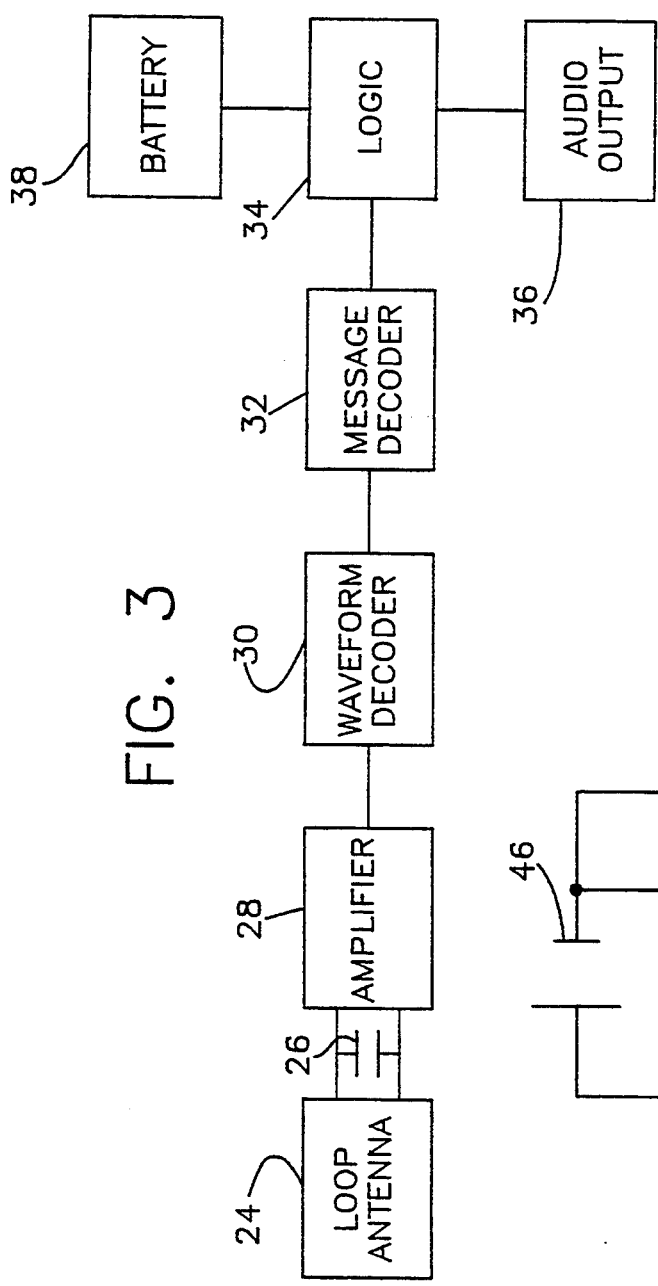
FIG. 3 is a block diagram of a transponder for use in this invention.

A transponder that is contained in each file is illustrated by the block diagram of FIG. 3. A loop antenna 24 that is tuned by a capacitor 26, which in this embodiment has a value of 240 pf, to the frequency at which the transmitter 16 of FIG. 2 operates, in this example 133.3 KHz, is coupled to the input of an amplifier 28. A waveform decoder 30 provides a given DC voltage during each packet of received RF cycles and passes them to a message decoder 32 that provides the commands. The commands are interpreted and acted upon by a logic block 34. The logic block 34 stores the address of the file in a register and generates a signal for energizing an audio output device 36 when required. A battery 38 provides operating voltage for the transponder.

Figure 4:
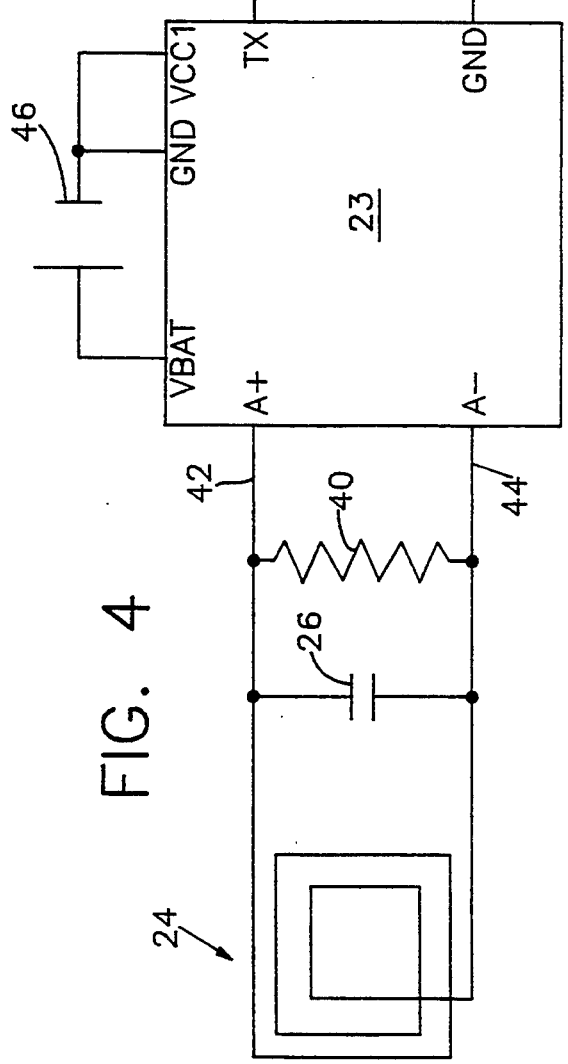
FIG. 4 is a schematic diagram showing the connections of a transponder chip DS1209S-B1.

FIG. 4 is a schematic diagram of a transponder/receiver showing the connections to a DS1209S0-B1 chip 23 that performs the functions indicated by the block diagram of FIG. 3. The chip is contained in a standard industry package 160SOTC which is approximately 0.409" by 0.405" and about 0.100" thick. As in FIG. 3, the capacitor 26 is connected in parallel with the loop antenna 24. A resistor 40 is connected in shunt with the capacitor 26. One end 42 of the loop antenna 24 is connected to a terminal A+ of the chip, and its other end 44 is connected to a terminal A−. Operating potential for the chip is supplied by a battery 46 that is connected as shown to terminals indicated by VBAT, GND and VCCI. Typically, the battery 46 has a thickness of about 0.1 inch. A crystal 48 for producing audible sound is connected between terminals labelled TX and GND, respectively, which are output terminals for transponder/receiver chip 23. The receiver may be implemented as shown in the schematic diagram of FIG. 4, for example.

Figure 5:
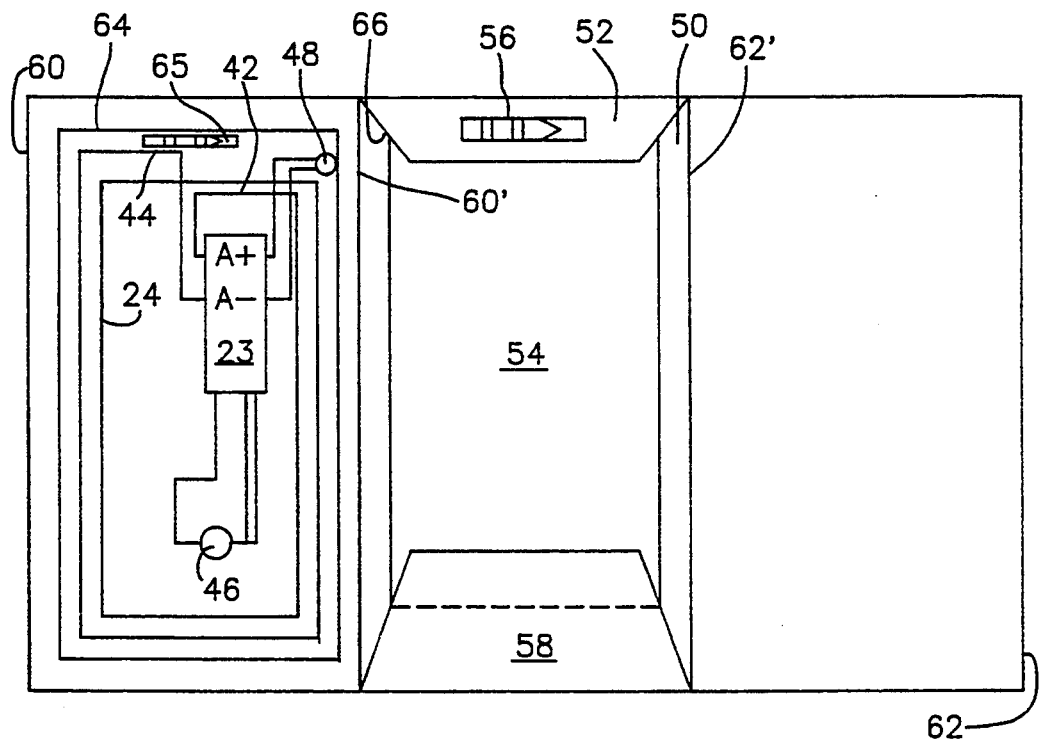
FIG. 5 illustrates a file folder with a transponder mounted on a removable sheet.

FIG. 5 shows an open file folder having a back 50, a top flap 52 to which papers 54 may be attached by a clip 56 and a bottom flap 58 for preventing loose papers from falling out, in this example. This particular file folder is shown as having two side flaps 60 and 62 that fold on respective fold lines 60' and 62' so as to overlie the papers 54 in a well known manner. However, the invention is applicable to numerous other file folders such as one having only one side flap.

Figure 7:
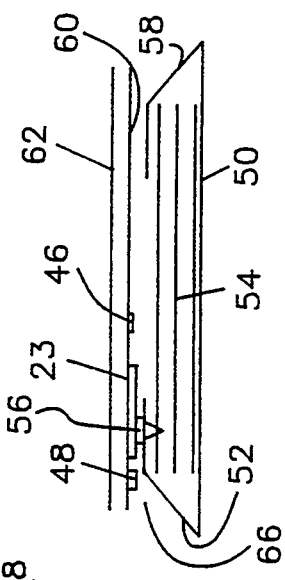
FIG. 7 is a vertical cross section taken along 7—7 of FIG. 5 when the file folder of FIG. 6 is closed so as to show a sound producing device communicating with space at its top.
Figure 6:
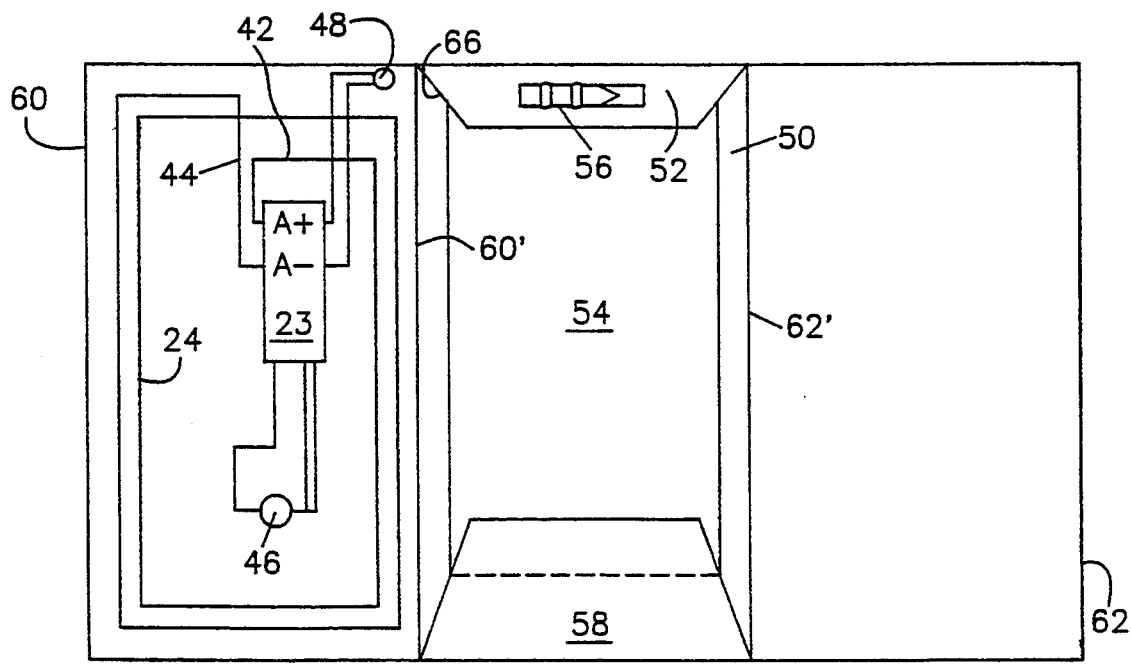
FIG. 6 illustrates a file folder with a transponder mounted on one of its flaps.

In this particular embodiment, the loop antenna 24 is formed or mounted on a separate layer or carrier 64 of non-conducting material, and its ends 42 and 44 are respectively connected to the A+ and A− terminals of the sheet-like chip 23 that is adhered by suitable glue to the layer 64. Typically, the sheet-like chip 23 has a thickness of less than 0.15 inch. Preferably, the loop antenna 24 is adjacent the outer edges of the layer 64 so as to increase its ability to send and receive RF waves. The layer 64 is removably attached to the side flap 60 by a clip 65. The wafer battery 46 is adhered to the layer 64 and is connected to the terminals of the chip 23 as better shown in FIG. 4. The means 48, such as a sound transducer for a digital watch, for producing audible sound is preferably adhered to the layer 64 at its upper right hand corner so as to be in registration with a space 66 that is formed above the file papers 54 and between the back 50 and the top flap 52. As the number of file papers 54 increases, the space is enlarged so as to permit sound produced by the means 48 to escape from the file and be heard. Even when the space is small because there are very few file papers, the means 48 will be in registration with the corresponding space of the next folder in the file or stack as the case may be. The space 66 is more clearly seen in the cross section of FIG. 7. FIG. 6 is the same as FIG. 5 except that the transducer components are mounted directly on the side flap 60 which serves as the layer 64.

The operation of a file finder system of this invention when using a DS6068A system to perform the functions of the message encoder 4, the waveform encoder 6 of FIG. 1, and a chip DS1209S-B1 to perform the functions of all of the amplifier 28, the waveform decoder 30, the message decoder 32 and the logic block 34 is described below. Further details for the DS6068A chip operation is given in the "Dallas Semiconductor DS6068AK Wireless Starter Kit User's Manual, Version 2.0" which is incorporated herein by reference. The transmission format consists of a sequence of packets of pulses (actually bursts of 133 KHz sine wave) separated by quiet times of a minimum of 50 μs, in this example. Each packet consists of either 20, 40, 60, 80 or 100 pulses (cycles of the sine wave). The 20 and 40 pulse packets are typically used to transmit zeros and ones, respectively. The 60, 80, and 100 pulse packets are used for control. The following operations can be accomplished with the sequences shown:

1. Turn on 1 KHz audio output tone for 1.2 seconds [100, 20,20,40,20,40,20,20,20, (16-bit address), 80,40,20]. In this format the 100 pulse packet initializes the receiver; the next eight packets of 20 and 40 pulses indicate that the receiver is to use all 16 bits of the address; the next sixteen packets of 20 and 40 pulses specify the address of the desired receiver (65,536 possibilities) and the last three packets turn on the tone.

2. Read the existing 16 address bits in the receiver—This operation is used when it is desired to assign an address to a receiver. Before this can be accomplished, the existing address must be learned. The following packets of RF cycles are transmitted: [100,20,20,20,40,40,20,20,20, (16-bit address), 80,40,20, 60,100,20,20,40,20,40,20,40,40, (16-bit address), (16 packets of 20)].

In this format, the transducer is placed in an electrically shielded environment. The 100-pulse packet initializes the receiver; the next eight packets of 20 and 40 pulses indicate that the receiver should not check the following 16 address bits; the 16-bit address can therefore be any combination of 20- and 40-pulse packets; the next four packets enable the output of the receiver, but do not turn the tone transducer or generator 48 on; the last 16 20-pulse packets cause the 16-bit address of the receiver to be placed serially on the output pin. This pin is monitored to verify the address.

3. Store 16 address bits in the receiver—This operation is used to assign a new address to a receiver once its existing address is known for uniquely or individually accessing the receiver. The pulse packets associated with the RF cycles are: [100,20,20,40,20,40,40,20,40, (old 16-bit address),-(new 16-bit address)].

In this format the 100-pulse packet initializes the receiver; the next eight packets of 20 and 40 pulses indicate that if the following 16-bit address corresponds to the stored address that the final 16-bit address in the sequence should replace it, the latter being the assigned address.

4. Lock the existing 16 address bits in the receiver—This operation is used to prevent accidental reassigning of addresses in a receiver. This operation can only be undone by removing the power from the receiver chip. The pulse packet used are: [100,20,20,40,20,40,40,40,20, (16-bit address)].

In this format the 100-pulse packet initializes the receiver; the next eight packets of 20 and 40 pulses indicate the selected receiver address that is to be locked.

The loop antenna 24 consists of a 5.28 mH inductor composed of multiple turns of number 36 wire laid out in a planar fashion along the periphery of the 8.5"×11" substrate. Capacitor is approximately 240 pf and should be chosen such that when combined with the inductance of antenna 24 and the stray capacitance of the receiver circuit, will resonate at 133 KHz. Resistor 40 is 22 KΩ. Chip 23 is a Dallas Semiconductor DS1209S-B1 Wireless-to-Three-Wire Converter Chip, and serves the function of the amplifier 28, waveform decoder 30, message decoder 32 and logic blocks 34 of FIG. 3. Battery 46 is a thin "button type" three-volt Lithium battery with a capacity sufficient to operate the receiver for more than a year. Transducer 48 is a piezoelectric audio output device commonly found in electronic watches with audio alarms, as previously mentioned.

Although various embodiments of the invention have been shown and described herein, they are not meant to be limiting. Those of skill in the art may recognize various modifications to these embodiments, which modifications are meant to be covered by the spirit and scope of the appended claims. For example, because of the flat sheet-like configuration of the present invention, and its thinness, the receiver portions thereof can be readily attached to boxes in a warehouse, or the binders of books in a library, and to other objects, for example, without materially extending the dimensions of the associated object. In this way, the associated object can be located using the invention without materially increasing the storage volume of the object.

What is claimed is:

1. Apparatus for attachment within a file folder having a large mass of sound absorbing material and having a space along an edge portion thereof, without appreciably increasing the thickness of said file folder, said apparatus being responsive to an outside stimulus from a remotely located interrogator so as to aid in locating the file folder if misplaced, said apparatus comprising:

a thin sheet of material conforming substantially to the inside dimensions of one flap of a file folder;

a loop antenna secured to said thin sheet proximate the outer circumference thereof, said antenna having opposite ends;

a battery in wafer form secured to said thin sheet having power output terminals for providing a D.C. operating voltage;

receiver circuitry secured to said thin sheet of material having two signal input terminals connected to said opposite ends of said antenna, two power input terminals connected to said power output terminals of said battery, and signal output terminals;

a sound producing device secured to said sheet and coupled to said output terminals;

said receiver circuitry having signal storage means for storing an address for said file folder and means for activating said sound producing device in response to a signal at its input terminals that represents said address;

the thickness of any one of said receiver circuitry, battery and sound producing device not exceeding 0.15 of an inch; and said apparatus being attached to said file folder for positioning said sound producing device adjacent said space, and said space providing a low acoustic impedance pathway from said sound producing device to areas outside said file folder.

2. Apparatus as set forth in claim 1, further comprising:

means in said receiver circuitry for changing the address stored in said storage means in response to coded signals applied to said input terminals.

3. Apparatus as set forth in claim 1, further comprising:

means in said receiver circuitry responsive to coded interrogation signals for providing output signals representing the address stored in said storage means.

4. Apparatus as set forth in claim 3, further comprising:

means in said receiver circuitry for changing the address stored in said storage means in response to coded signals applied to said signal input terminals.

5. Apparatus as set forth in claim 1, wherein said sheet of material is an integral part of said file folder.

6. Apparatus as set forth in claim 1, wherein said sheet of material is adapted for removable attachment to a file folder.

7. Apparatus including receiver means for attachment to a file folder without substantially increasing its thickness, and a transmitter for transmitting an address signal unique to said receiver means, said receiver means being responsive to said address signal for activating a sound producing device means for producing an audible signal to aid in locating the file folder if misplaced, wherein the improvement comprises:
- a thin sheet of non-conductive material having the same interior dimensions of a flap of said file folder to which said sheet is adapted to be attached;
- a loop antenna secured to said sheet proximate the circumference thereof, said antenna having opposite ends;
- a battery in wafer form secured to said sheet, said battery having power output terminals for providing a D.C. operating voltage;
- said receiver means including a sheet-like signal receiver secured to said sheet, said receiver having two signal input terminals connected to said opposite ends of said antenna, two power input terminals connected to said power output terminals of said battery secured to said sheet of non-conductive material; and
- said sound producing means includes a thin sound producing transducer coupled to said output terminals and secured at one edge of said sheet adjacent a space within said file folder, said space providing a low acoustic impedance pathway from said sound producing transducer to areas outside said file folder.

8. The apparatus of claim 7, wherein said receiver means further includes signal storage means for storing an address predetermined for said file folder, and said activating means being responsive to a received signal address identical to the stored address in said signal storage means.

9. The apparatus of claim 8, further comprising:
means in said receiver means for changing the address stored in said storage means in response to coded signals applied to said antenna.

10. The apparatus of claim 7, wherein said sheet of non-conductive material is an integral part of said file folder.

11. The apparatus of claim 7, wherein said sheet of non-conductive material is adapted for removable attachment to said file folder.

* * * * *